United States Patent
Inoue

(10) Patent No.: US 7,251,237 B2
(45) Date of Patent: Jul. 31, 2007

(54) COMMUNICATION SYSTEM WITH MOBILE TERMINAL ACCESSIBLE TO MOBILE COMMUNICATION NETWORK AND LOCAL NETWORK SIMULTANEOUSLY

(75) Inventor: Atsushi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 11/187,903

(22) Filed: Jul. 25, 2005

(65) Prior Publication Data
US 2005/0255880 A1    Nov. 17, 2005

Related U.S. Application Data

(62) Division of application No. 09/947,512, filed on Sep. 7, 2001, now Pat. No. 7,136,368.

(30) Foreign Application Priority Data
Sep. 8, 2000    (JP) .............................. 2000-273659

(51) Int. Cl.
*H04Q 7/24* (2006.01)
(52) U.S. Cl. ..................... 370/338; 370/352; 370/331; 370/475; 455/456.1
(58) Field of Classification Search ................ 370/331, 370/475, 313, 342, 338, 352, 328; 455/455, 455/445, 552.1, 403, 456.1, 456.2, 456.3
See application file for complete search history.

(56) References Cited

U.S. PATENT DOCUMENTS

| | | | | |
|---|---|---|---|---|
| 6,272,129 B1 * | 8/2001 | Dynarski et al. | ........... | 370/356 |
| 6,473,097 B1 * | 10/2002 | Elliott | ........................ | 715/733 |
| 6,473,411 B1 * | 10/2002 | Kumaki et al. | ............. | 370/331 |
| 6,477,644 B1 * | 11/2002 | Turunen | ..................... | 713/161 |
| 6,490,259 B1 * | 12/2002 | Agrawal et al. | ............ | 370/331 |
| 6,625,135 B1 * | 9/2003 | Johnson et al. | ............. | 370/332 |
| 6,744,753 B2 * | 6/2004 | Heinonen et al. | ........... | 370/338 |
| 6,834,192 B1 * | 12/2004 | Watanabe et al. | ........... | 455/444 |
| 6,847,823 B2 * | 1/2005 | Lehikoinen et al. | ..... | 455/456.1 |
| 6,853,851 B1 * | 2/2005 | Rautiola et al. | ......... | 455/553.1 |

* cited by examiner

*Primary Examiner*—Wing Chan
*Assistant Examiner*—Nguyen Ngo
(74) *Attorney, Agent, or Firm*—Oblon, Spivak, McClelland, Maier & Neustadt, P.C.

(57) ABSTRACT

In a communication system using a mobile terminal capable of accessing both a mobile communication network and a local network simultaneously and a gateway provided between a fixed communication network and the local network, the mobile terminal transmits an inquiry message for inquiring information regarding a location on networks of a correspondent of packet communications, to the gateway through the local network, and receives a response message indicating the lookup processing result from the gateway through the local network. Then, the mobile terminal acquires an address to be used in the packet communications with the correspondent according to the response message, and assigns the address to a communication interface for the local network.

10 Claims, 8 Drawing Sheets

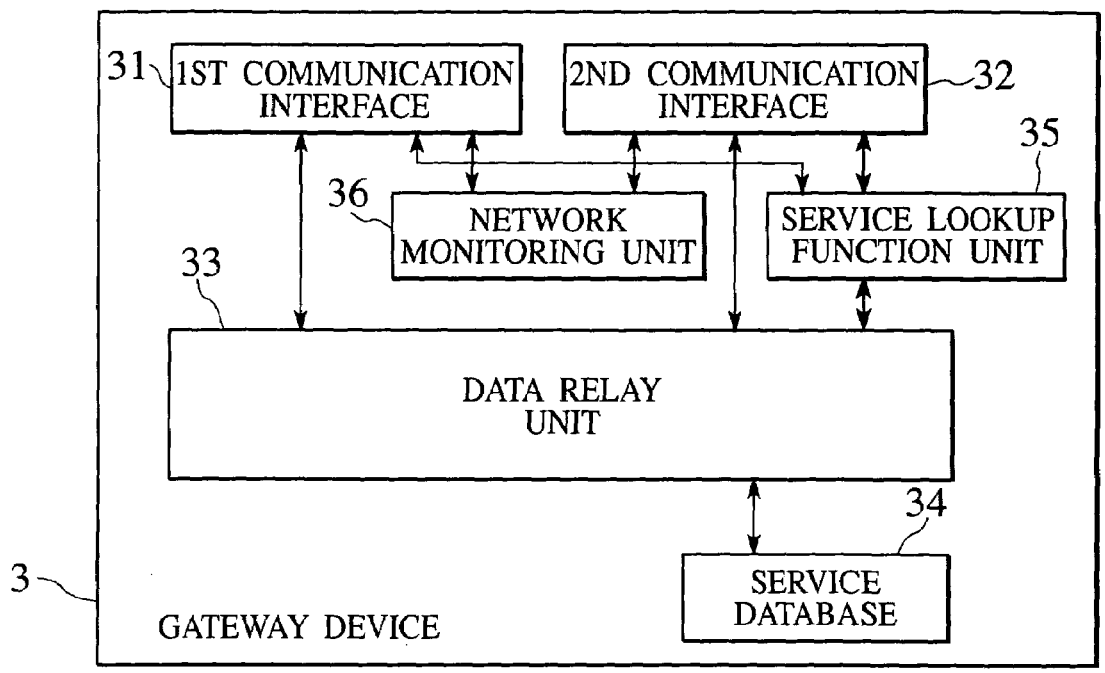
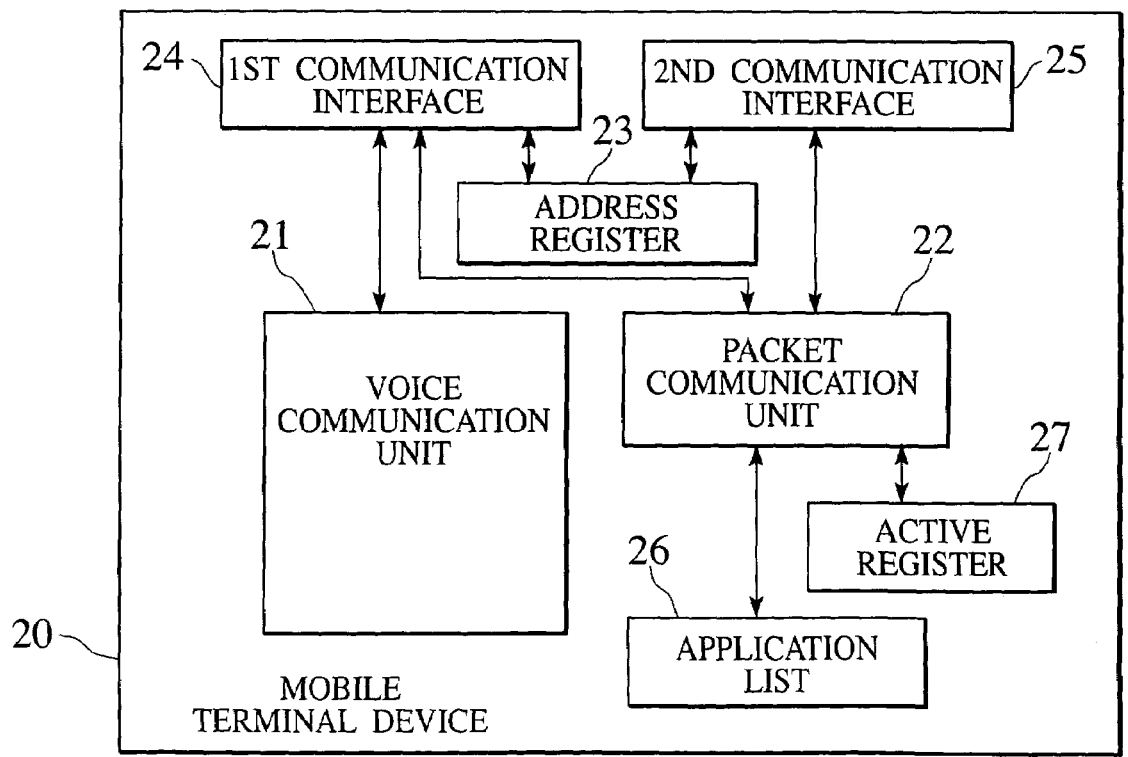

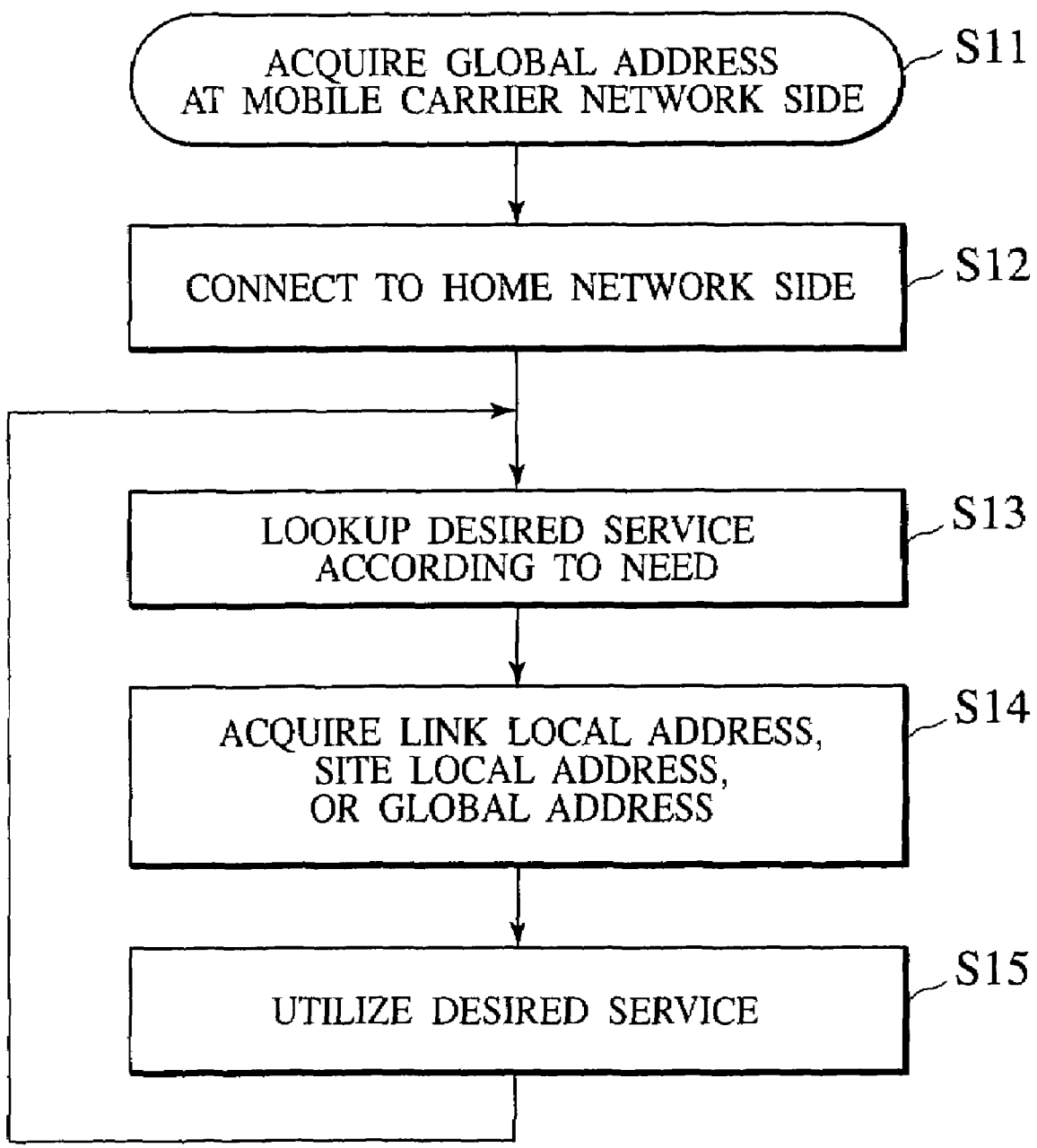

DESTINATION OPTION

COMMUNICATION SYSTEM WITH MOBILE TERMINAL ACCESSIBLE TO MOBILE COMMUNICATION NETWORK AND LOCAL NETWORK SIMULTANEOUSLY

CROSS REFERENCE TO RELATED APPLICATION

This application is a division of patent application Ser. No. 09/947,512, filed Sep. 7, 2001 now U.S. Pat. No. 7,136,368, the entire contents of which are incorporated herein by reference. The present document incorporates by reference the entire contents of Japanese priority document 2000-273659, filed Sep. 8, 2000.

BACKGROUND OF THE INVENTION

1. Field of the Invention

The present invention relates to a mobile communication system using a mobile terminal device which is capable of accessing both a mobile communication network and a local network simultaneously and a gateway device for relaying between a fixed communication network and a local network.

2. Description of the Related Art

In conjunction with the rapid spread of cellular phones and the Internet, the Internet service using a cellular phone as a terminal has been developed by the mobile communication service providers. This is a service in which a module for processing a communication protocol called TCP/IP used in the Internet is provided in the cellular phone so as to enable WWW service, e-mail delivery, static image and video image data transfer, etc. This service has an advantage in that it becomes possible to freely access not just information closed within the communication service provider but also various information available on the Internet that is spreading worldwide, and for this reason the number of users of this service is increasing rapidly.

Now, the cellular phone Internet service that has an enormous number of users encounters a serious problem regarding how to assign addresses to terminals. Currently, the Internet faces with the problem of IP address shortage in view of the ever increasing number of nodes (routers and terminals), and in the current IPv4, it has been customary to use an address system called private address that is closed within an organization for accesses in an enterprise network and to use global addresses only for accesses to the external of the organization by utilizing the address conversion. Similarly, in the case of the cellular phone Internet service, it is currently customary to use the private address within the cellular phone network by providing an address conversion device (NAT: Network Address Translator) at a border between the IP packet network of the cellular phone company and the global Internet.

On the other hand, the next generation IP specification called IPv6 is currently under the development. The IPv6 can accommodate far more nodes compared with the IPv4 by expanding the IP address from a 32 bits width as used in the IPv4 to a 128 bits width. Similarly, in the case of the cellular phone Internet service, it is possible to assign unique global addresses to all terminals by adopting the IPv6. In this way, communications using a seamless end-to-end connection that does not require a relay device such as NAT on the communication path can be realized by using a wide address space, and it is expected to be advantageous in many aspects including the security and the quality of service (QoS). Also, the IPv6 has a function called address autoconfiguration for automatically generating an address from a network ID managed by each router and a unique ID of the device, and this is expected to make the management of hosts easier.

Also, recently, in conjunction with the advance of the wireless technology, the techniques for locally connecting various types of devices by a wireless network have been developed. One such technique is the wireless standard called Bluetooth which connects devices in short distances by using 2.4 GHz unlicensed radio band. In the Bluetooth, devices can carry out mutual data communications by forming an ad-hoc network called pico-net. The similar network specification also includes the HomeRF which is intended for use in the home network.

Now, using the IPv6 with the above described features, it is possible to consider a situation where a portable terminal is capable of both the Internet access via the cellular phone network and the Internet access via the ISP (Internet Service Provider) network from a home network or a local network such as the Bluetooth or the like. In such a situation, when the portable terminal starts the Internet communications using either the cellular phone network or the local network+ the ISP network, the setting of the portable terminal can be made according to commands from a router device on the cellular phone network or a router device on the ISP network. However, in the case where the portable terminal receives a service from the cellular phone network side while it also moves into the local network and carries out communications through the local network, there is a need to determine which one of the Internet access via the cellular phone network and the Internet access via the local network+the ISP network should be selected, and how the setting for it should be made, according to some policy.

BRIEF SUMMARY OF THE INVENTION

It is therefore an object of the present invention to provide a mobile communication system in which each mobile terminal device is capable of making reasonable judgement and setting regarding the necessary address setting, appropriate communication route selection, etc., in the case of moving into the local network while receiving the communication service on the mobile communication network.

According to one aspect of the present invention there is provided a communication system, comprising: a mobile terminal device capable of accessing both a mobile communication network and a local network simultaneously; and a gateway device provided between a fixed communication network and the local network; the mobile terminal device having: an inquiry message transmission unit configured to transmit an inquiry message for inquiring information regarding a location on networks of a correspondent of packet communications to be carried out, through the local network; the gateway device having: a lookup unit configured to carry out a lookup processing to determine whether the location of the correspondent on networks is on the local network, or within same management domain on the fixed communication network as the mobile terminal device and outside the local network, or outside the same management domain on the fixed communication network, upon receiving the inquiry message from the mobile terminal device through the local network; and a transmission unit configured to transmit a result of the lookup processing obtained by the lookup unit as a response message to the mobile terminal device through the local network; and the mobile terminal device also having: an address assignment unit configured to receive the response message from the gateway device through the local network, acquire an address to be used by the mobile terminal device in the packet communications with the correspondent according to the response message, and assign the address to a communication interface for the local network.

According to another aspect of the present invention there is provided a mobile terminal device capable of accessing both a mobile communication network and a local network simultaneously, the mobile terminal device comprising: a first communication interface provided with respect to the mobile communication network; a second communication interface provided with respect to the local network; a packet communication unit configured to carry out first packet communications through the first communication interface and second packet communications through the second communication interface; an inquiry message transmission unit configured to transmit an inquiry message for inquiring information regarding a location on networks of a correspondent of packet communications to be carried out, through the second communication interface; and an address assignment unit configured to receive a response message in response to the inquiry message through the second communication interface, acquire an address to be used by the mobile terminal device in the packet communications with the correspondent according to the response message, and assign the address to the second communication interface.

According to another aspect of the present invention there is provided a gateway device provided between a fixed communication network and a local network, for relaying communications of a mobile terminal device capable of accessing both a mobile communication network and the local network simultaneously, the gateway device comprising: a first communication interface provided with respect to the fixed communication network; a second communication interface provided with respect to the local network; a packet communication unit configured to carry out first packet communications through the first communication interface and second packet communications through the second communication interface; a lookup unit configured to carry out a lookup processing to determine whether a location of a prescribed device or service on networks is on the local network, or within same management domain on the fixed communication network as a mobile terminal device and outside the local network, or outside the same management domain on the fixed communication network, upon receiving an inquiry message for inquiring information regarding the location of the prescribed device or service on networks from the mobile terminal device through the second communication interface; and a transmission unit configured to transmit a result of the lookup processing obtained by the lookup unit as a response message to the mobile terminal device through the second communication interface.

According to another aspect of the present invention there is provided an address assignment method for a mobile terminal device capable of accessing both a mobile communication network and a local network simultaneously, the method comprising: transmitting an inquiry message for inquiring information regarding a location on networks of a correspondent of packet communications to be carried out, from the mobile terminal device through the local network; and receiving a response message in response to the inquiry message through the local network at the mobile terminal device; acquiring an address to be used by the mobile terminal device in the packet communications with the correspondent according to the response message; and assigning the address to a communication interface for the local network at the mobile terminal device.

According to another aspect of the present invention there is provided a lookup service method of a gateway device provided between a fixed communication network and a local network, for relaying communications of a mobile terminal device capable of accessing both a mobile communication network and the local network simultaneously, the method comprising: carrying out a lookup processing to determine whether a location of a prescribed device or service on networks is on the local network, or within same management domain on the fixed communication network as a mobile terminal device and outside the local network, or outside the same management domain on the fixed communication network, upon receiving an inquiry message for inquiring information regarding the location of the prescribed device or service on networks from the mobile terminal device through the local network at the gateway device; and transmitting a result of the lookup processing as a response message to the mobile terminal device through the local network from the gateway device.

According to another aspect of the present invention there is provided a computer program product for causing a computer of a mobile terminal device capable of accessing both a mobile communication network and a local network simultaneously, to execute an address assignment, the computer program product comprising: first computer program codes for causing the computer to transmit an inquiry message for inquiring information regarding a location on networks of a correspondent of packet communications to be carried out, from the mobile terminal device through the local network; second computer program codes for causing the computer to receive a response message in response to the inquiry message through the local network; third computer program codes for causing the computer to acquire an address to be used by the mobile terminal device in the packet communications with the correspondent according to the response message; and fourth computer program codes for causing the computer to assign the address to a communication interface for the local network at the mobile terminal device.

According to another aspect of the present invention there is provided a computer program product for causing a computer of a gateway device provided between a fixed communication network and a local network, for relaying communications of a mobile terminal device capable of accessing both a mobile communication network and the local network simultaneously, to provide a lookup service, the computer program product comprising: first computer program codes for causing the computer to carry out a lookup processing to determine whether a location of a prescribed device or service on networks is on the local network, or within same management domain on the fixed communication network as the mobile terminal device and outside the local network, or outside the same management domain on the fixed communication network, upon receiving an inquiry message for inquiring information regarding the location of the prescribed device or service on networks from the mobile terminal device through the local network; and second computer program codes for causing the computer to transmit a result of the lookup processing as a response message to the mobile terminal device through the local network.

Other features and advantages of the present invention will become apparent from the following description taken in conjunction with the accompanying drawings.

BRIEF DESCRIPTION OF THE DRAWINGS

FIG. 2 is a block diagram showing an exemplary configuration of a gateway device in the communication system of FIG. 1.

FIG. 3 is a block diagram showing an exemplary configuration of a mobile terminal device in the communication system of FIG. 1.

FIG. 4 is a flow chart showing an exemplary processing procedure for one operation by the mobile terminal device of FIG. 3.

DETAILED DESCRIPTION OF THE INVENTION

Referring now to FIG. 1 to FIGS. 10A and 10B, one embodiment of a mobile communication system according to the present invention will be described in detail.

Figure 1:
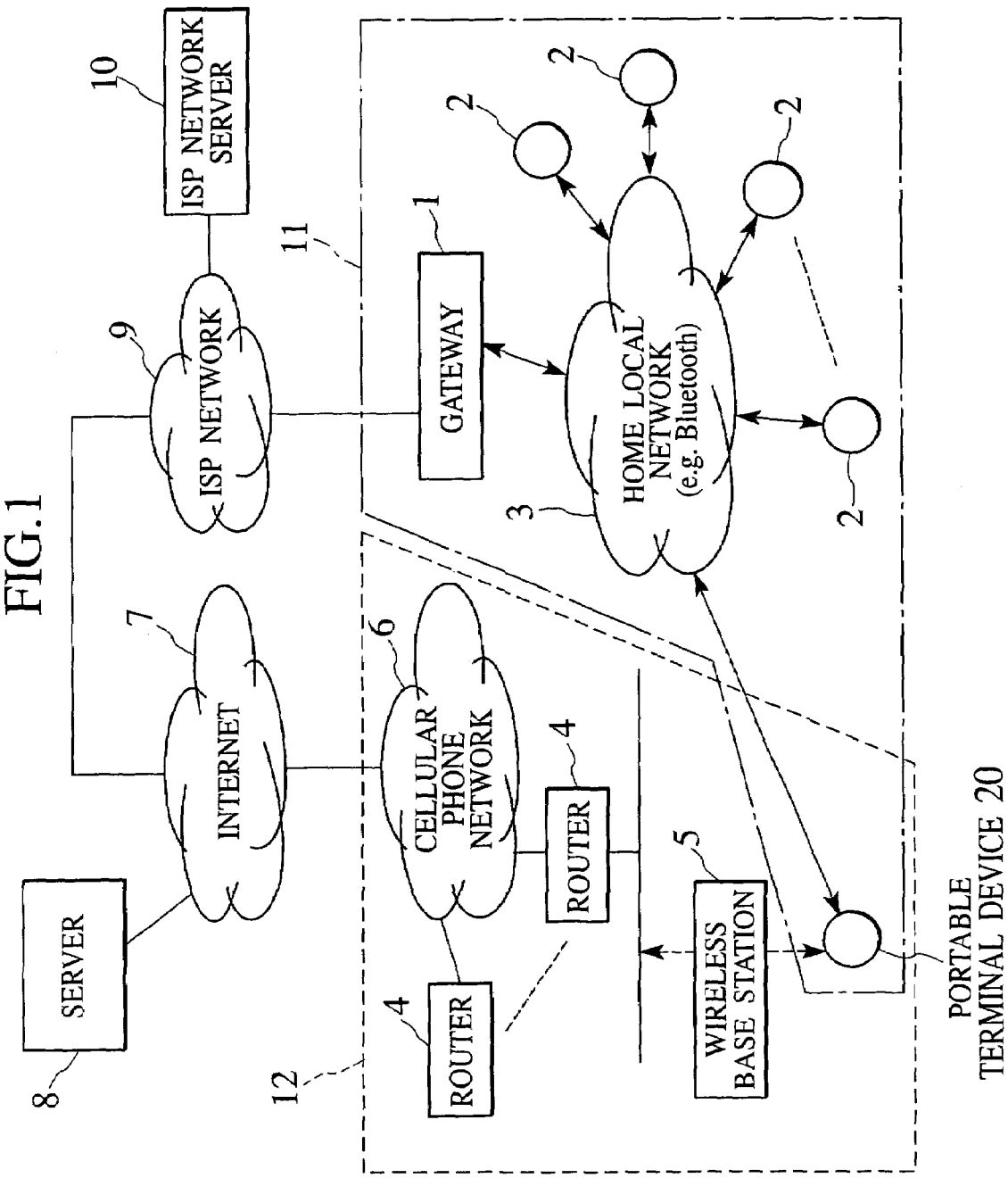
FIG. 1 is a block diagram showing an exemplary configuration of a communication system according to one embodiment of the present invention.

FIG. 1 shows an exemplary configuration of a communication system according to this embodiment.

In FIG. 1, a region enclosed by a dashed line 12 corresponds to a mobile carrier network portion, while a region enclosed by a chain line 11 corresponds to a home network portion.

In the following, the exemplary case where a mobile terminal device 20 moves into the home network 11 while carrying out communications through the mobile carrier network 12 will be mainly described.

In the mobile carrier network 12, a plurality of network links are connected through a cellular phone network 6 and router devices 4. Each router device 4 has at least functions of an ordinary router compatible with the IPv6.

The mobile carrier network 12 is assumed to be originally providing the ordinary voice communication service, but a configuration for providing the ordinary voice communication service is omitted in FIG. 1. Note that this embodiment is directed to the exemplary case where one mobile carrier manages its own packet communication network as a single management domain, but there can also be cases where one mobile carrier has a plurality of management domains, cases where a plurality of mobile carriers have a single common management domain, and any combination of these cases.

The mobile terminal device 20 (such as a portable terminal or a cellular phone, for example) will be connected to the corresponding network link through a wireless base station 5 corresponding to a geographic location of the mobile terminal device 20. Then, the mobile terminal device 20 becomes capable of carrying out packet communications according to the IPv6 with a node located within the same network link, a node within the same management domain through the router device 4, or a node (such as a server 8, for example) located outside the management domain through the router device 4 and the Internet 7.

On the other hand, in the home network 11, various types of devices 2 and a gateway 1 are connected through a home local network 3. The mobile terminal device 20 has a function for accessing this home local network 3.

Also, the gateway device 1 is assumed to be connected to the external Internet 7 through a fixed communication network 9 (which is assumed to be an ISP network here). Note that this embodiment is directed to the exemplary case where one Internet service provider manages its own range for providing the Internet connection service as a single management domain, but there can also be cases where one service provider has a plurality of management domains, cases where a plurality of service providers have a single common management domain, and any combinations of these cases.

The mobile terminal device 20 and the devices 2 connected to the home local network 3 are capable of carrying out packet communications according to the IPv6 with the server 8 on the Internet 7 through the gateway device 1 and the ISP network 9. In addition, they are also capable of carrying out packet communications according to the IPv6 with a server 10 for providing services limited only to members within the ISP network 9, for example, when such a server 10 exists.

In this embodiment, the home local network 3 is assumed to be a local wireless network such as Bluetooth, for example.

Note that, in FIG. 1, the dashed line 12 and the chain line 11 are depicted only for the sake of explaining the basic configuration logically, and they do not indicate an area covered by the wireless network. In this embodiment mobile terminal device 20 is assumed to be capable of accessing both the mobile carrier network 12 and the home local network 3 simultaneously.

FIG. 2 shows an exemplary configuration of the gateway device 1 in this embodiment.

As shown in FIG. 2, this gateway device 1 comprises a first communication interface 31 for accessing the ISP network 9, a second communication interface 32 for accessing the home local network 3, a data relay unit 33 for relaying between the first and second communication interfaces 31 and 32, a service database 34, a service lookup function unit 35, and a network monitoring unit 36. If necessary, the data relay device 33 may include a function for carrying out a protocol conversion, a media conversion, etc., at a time of relaying between the first and second communication interfaces 31 and 32.

The service lookup function unit 35 is operated when a service lookup inquiry message is received through the the second communication interface 32, to look up the requested service through the service database 34 or inquire the requested service to another server and returns the lookup result to the inquiring source.

The network monitoring unit 36 is operated when a network state inquiry message is received through the second communication interface 32, to returns a message containing information on a network state of the ISP network 9 side to the inquiring source.

Note that the gateway device 1 may also have functions as the IPv6 compatible router in the home local network 3, or another IPv6 compatible router may be provided in the home local network 3.

FIG. 3 shows an exemplary configuration of the mobile terminal device 20 in this embodiment.

As shown in FIG. 3, this mobile terminal device 20 comprises a first communication interface 24 for accessing the mobile carrier network 12, a second communication interface 25 for accessing the home local network 3, a voice communication unit 21 for carrying out ordinary voice communications, a packet communication unit 22 for carrying out packet communications according to the IPv6, an address register 23, an application list 26, and an active register 27.

The mobile terminal device 20 is capable of relating a plurality of IPv6 addresses with respect to the same communication interface (capable of sending packets by using a plurality of IPv6 addresses from the same communication interface). The address register 23 is used for the purpose of storing these addresses.

A various IPv6 applications are to be operated on the mobile terminal device 20 side, and an application list 26 is used for storing a list of these applications (which includes information for identifying each application (a file name, for example) and an application type of each application, for example).

Also, when the specific application is activated by the user, the active register 27 registers information regarding the currently operated application (such as information for identifying that application, application type of that application, and information for indicating a communication interface used for that application (either the first communication interface or the second communication interface), for example).

Here, the address scope defined in the IPv6 will be described (see RFC 2373 for further details).

In the IPv6, the following three address scopes are defined.

(1) Link Local Address

This is an address valid only within the same network link, which has a prefix of 1111 1110 10 in the IPv6.

(2) Site Local Address

This is an address valid only within the same management domain, which has a prefix of 1111 1110 11 in the IPv6.

(3) Global Address

This is an address which is unique over the entire Internet.

In the example of FIG. 1, the mobile terminal device 20 connected to the mobile carrier network 12 can carry out communications using (arbitrary address containing) the link local address with respect to the server 4 (which is in a positional relationship of being located) on the same network link as the mobile terminal device 20, and communications using a site local address (or a global address) with respect to a server (which is in a positional relationship of being located) in the same management domain as the mobile terminal device 20. On the other hand, the mobile terminal device 20 connected to the mobile carrier network 12 will carry out communications using a global address with respect to the server 8 (which is in a positional relationship of being located) on the general Internet 7.

Now, the first communication interface 24 of this mobile terminal device 20 can be always assigned with one or both of the link local address and the site local address. The link local address and the site local address will be derived from the prefix defined in the IPv6 and the device ID of this mobile terminal device 20. Note that it is also possible for the communication service provider to assign arbitrary address as an address to be used in the same network link. Also, which one of the link local address alone, the site local address alone, and both the link local address and the site local address is to be always assigned can be determined according to the policy of the communication service provider.

By always assigning the link local address alone, the site local address alone, or both the link local address and the site local address, the mobile terminal device 20 becomes always capable of utilizing (carrying out communications for) on-link services using (arbitrary address containing) the link local address (such as the advertisement delivery from a specific wireless base station group, for example), and/or services within domain which are services of the service provider in this embodiment (such as information service limited to the users of that service provider, for example).

On the other hand, the global address to be assigned will be generated from a network prefix delivered from the nearest neighbor router device 4 and the ID information (EUI-64) of the mobile terminal device 20, according to the "Stateless Address Autoconfiguration" (RFC 2461) defined in the IPv6.

The basic procedure for the global address generation is as follows. Namely, the router device 4 regularly broadcasts a router advertisement message on-link, or the router device 4 returns a response message upon receiving an inquiry message, and the mobile terminal device 20 receives the router advertisement message, or sends an inquiry message and receives the response message, generates the global address by using the network prefix contained in the received message, and transmits an address information notification message containing the generated IPv6 address and a MAC address to the router device 4 side. Upon receiving the address information notification message, the router device 4 makes an entry of a corresponding information into a corresponding table called neighborhood cache (which corresponds to the ARP table in the IPv4). As a result, the nearest neighbor router device 4 will carry out the delivery of packets destined to the mobile terminal device 20.

Note that the user may be allowed to freely carry out the acquisition, setting and starting of the use of the IPv6 global address, or the discarding, setting and ending of the use of the IPv6 global address. Alternatively, it is also possible to use a provision in which the processing for starting the use of the global address is carried out when the user of the mobile terminal device 20 activates an application that requires the global address, and the processing for ending the use of that global address is carried out when that application is finished.

In this embodiment, the assignment of the global address to the second communication interface 25 of the mobile terminal device 20 is to be controlled using the above described address scope function.

In the example of FIG. 1, when the same network link is set to be within the home network 11, the mobile terminal device 20 connected to the home network 11 can carry out communications using (arbitrary address containing) the link local address with respect to a correspondent such as the other device 2 or the gateway device 1 through the home local network 3, and when the same site is set to be within the ISP network 9, the mobile terminal device 20 connected to the home network 11 can carry out communications using a site local address (or a global address) with respect to a correspondent such as the server 10 within the ISP network 9. On the other hand, the mobile terminal device 20 connected to the ISP network 9 via the home network 11 will carry out communications using a global address with respect to the server 8 on the general Internet 7.

In the following, the operation in the case where the mobile terminal device 20 moves toward the home network 11 while receiving the service on the mobile carrier network 12 side by using the assigned global address, and establishes a wireless link with the home local network 3 to become a member of the home network 11, will be described.

FIG. 4 shows an exemplary processing procedure of the mobile terminal device 20 in this case.

First, the global address is assigned to the mobile terminal device 20 at the mobile carrier network 12 side (step S11), and when the mobile terminal device 20 approaches to the home network 11 while receiving the service on the mobile carrier network 12 side, the mobile terminal device 20 detects radio signals of the other devices and establishes a link (step S12). This wireless link establishing can be realized by a method specified for each radio medium. At this point, if there is no particular job that uses the local network on the Bluetooth side, it suffices to wait in the wireless link established state.

Next, suppose that a service on the Bluetooth link side is requested from the mobile terminal device 20. This request can be made by a task unique to the mobile terminal device 20, or by sending a result of a task on the mobile carrier network 12 side to some device on the Bluetooth network side by utilizing a direct bridging, for example.

At this point, the mobile terminal device 20 looks up a resource (a desired service) to be accessed on the Bluetooth side (step S13). In this case, it is possible to use various methods such as a method using SDP (Service Discovery Protocol) defined in the Bluetooth, a method using SLP (Service Location Protocol) for looking up arbitrary service on the Internet, etc., and any suitable combination can be used according to factors such as a range to be looked up, a type of a service to be looked up, etc. Here, it is assumed that the resource on the local Bluetooth link will be looked up by using the SDP first, and if it cannot be found, the wider range will be looked up by using the SLP. It is also possible to use a configuration in which the gateway device 1 of FIG. 2 relays a query message for that purpose and becomes an agent of the SLP itself, for example.

Next, the mobile terminal device 20 acquires a necessary address (a link local address, a site local address or a global address) according to a positional relationship between the mobile terminal device 20 and the correspondent as obtained from the service lookup result, and assigns it to the second communication interface 25 (step S14). Then, the mobile terminal device 20 utilizes the desired service (step S15). Thereafter, the steps S13 to S15 will be repeated according to the need. However, the step S14 can be skipped when the necessary address is already acquired.

Next, the above described service lookup result will be described for three different cases.

Figure 5:
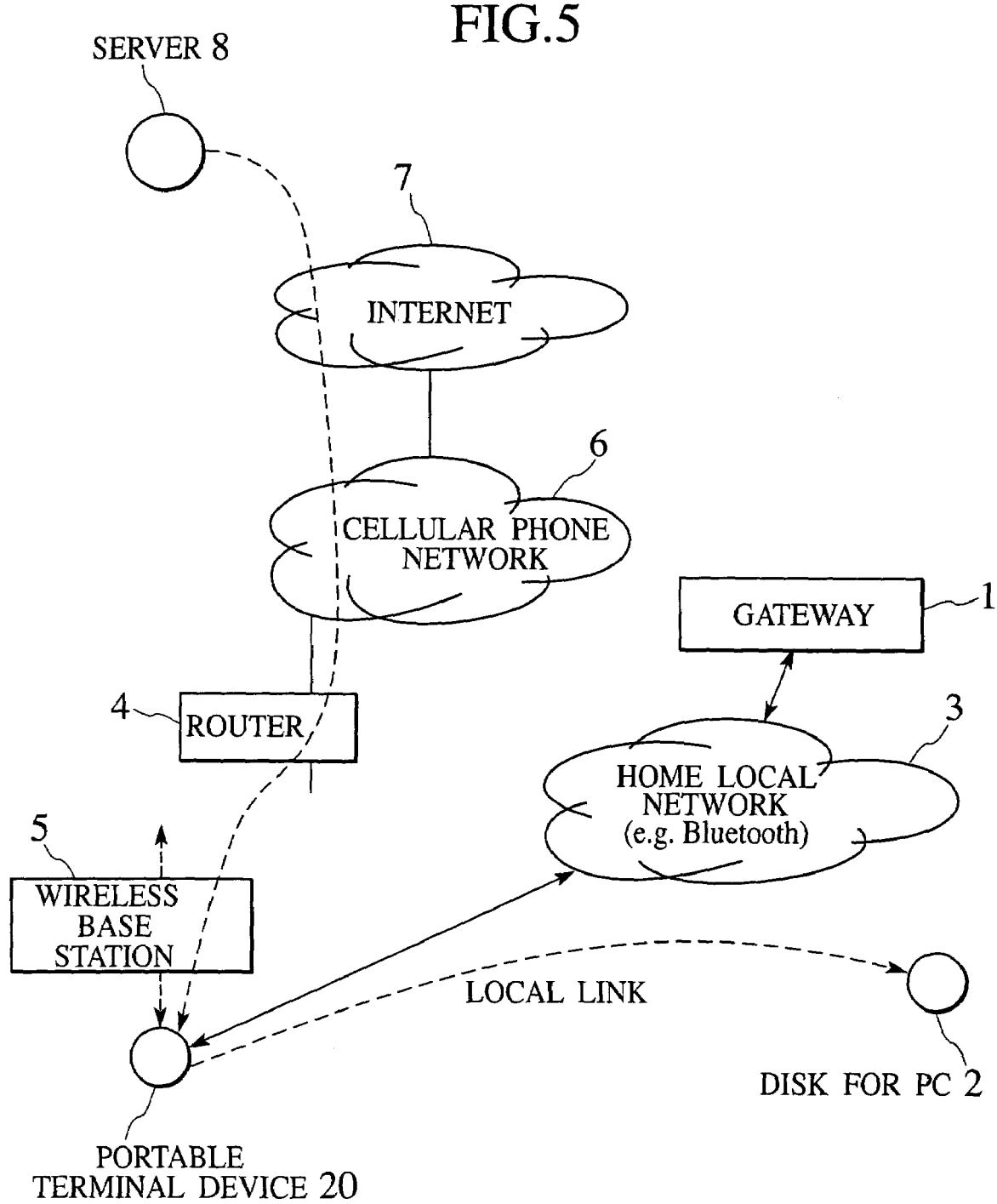
FIG. 5 is a block diagram showing a part of the communication system of FIG. 1 for explaining one exemplary operation that can be carried out.

First, in the case where the resource is found to be a link locally accessible one in the home local network 3 as a result of the service lookup, the communications will be carried out by assigning the link local IPv6 address to the home local network 3 side in the mobile terminal device 20. This procedure will be used in the case of storing the image data downloaded from the mobile carrier network 12 side into a disk for a PC as shown in FIG. 5, for example.

Figure 6:
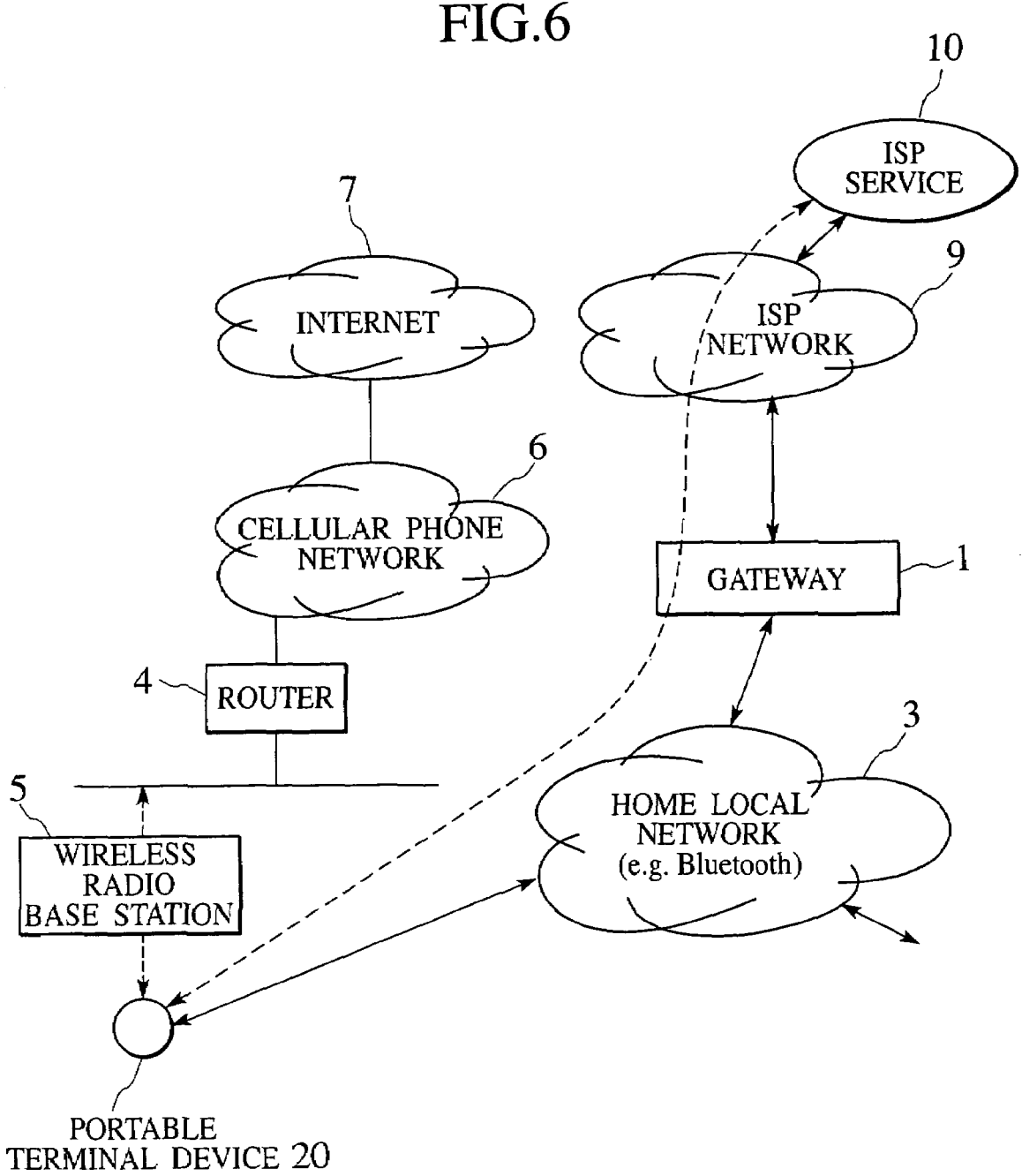
FIG. 6 is a block diagram showing a part of the communication system of FIG. 1 for explaining another exemplary operation that can be carried out.

Next, in the case where the resource is found to be a site locally accessible one in the ISP network 9 on the home local network 3 side as a result of the service lookup, the communications will be carried out by assigning the site local IPv6 address to the home local network 3 side in the mobile terminal device 20. This procedure will be used in the case of receiving the service limited only to members of the ISP which is provided by the server 10 in the ISP network 9 as shown in FIG. 6, for example.

On the other hand, in the case where the resource is found to be located on the global Internet 7 as a result of the service lookup, the communications will be carried out by assigning a global IPv6 address to the home local network 3 side in the mobile terminal device 20. At this point, the mobile terminal device 20 becomes capable of accessing the resource located on the global Internet 7 either via the mobile carrier network 12, or via the gateway device 1 through the home local network 3. This is the state called "multi-home" in which the mobile terminal device 20 becomes a router having two communication interfaces which are connected to different providers.

In the case of this multi-home state, both of the communication interfaces can be made available. In such a case, one communication interface can be used mainly while the other communication interface is used as a back-up, and which communication interface should be used mainly can be determined according to factors such as the congestion state of each network, the charging state of each network, etc.

For example, the home network 11 side can be selected when the charge is much cheaper on the ISP network side (the fixed network side), or the mobile carrier network 12 side can be selected when the network speed is faster on the mobile carrier network 12 side. Also, the communication interface to be selected can be determined by accounting for a dynamically varying state, instead of determining it fixedly. Such a policy can be set by the user or a vendor of the terminal in advance into a control unit (not shown) inside the mobile terminal device 20.

Note that the state or the like of the ISP network 9 side may be acquired by inquiring it to the gateway device 1 or the like, for example. Also, the mobile terminal device 20 itself may maintain the charging condition or the like of the ISP network 9 side.

Similarly, the state or the like of the mobile carrier network 12 side may be acquired by inquiring it to a prescribed server device or the like on the mobile carrier network 12 side, for example. Also, the mobile terminal device 20 itself may maintain the charging condition or the like of the mobile carrier network 12 side.

Figure 7:
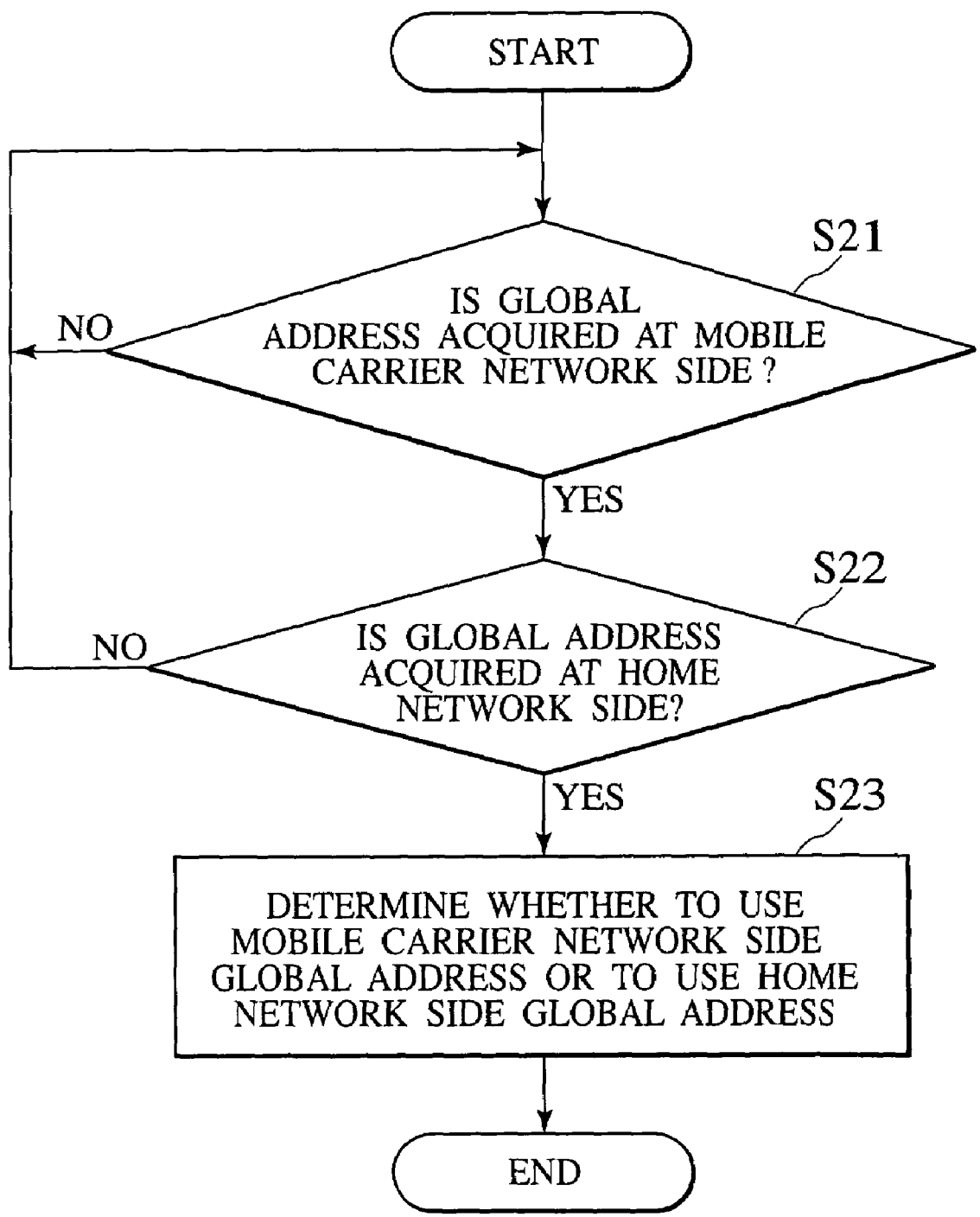
FIG. 7 is a flow chart showing an exemplary processing procedure for another operation by the mobile terminal device of FIG. 3.

FIG. 7 shows an exemplary processing procedure of the mobile terminal device 20 in this case. Namely, in the case where the global address is available on both the mobile carrier network 12 side and the home network 11 side (step S21 YES, step S22 YES), which one of the global address on the mobile carrier network 12 side and the global address on the home network 11 side should be used is determined according to various factors (step S23).

Now, while the processing on the home local network 3 side in the mobile terminal device 20 is carried out in this way, the job on the mobile carrier network 12 side may be finished. This job status on the mobile carrier network 12 side regarding the finished state can be detected by regularly checking the active register 27 in the mobile terminal device 20. When all the jobs on the mobile carrier network 12 side are finished, the entire network setting on the mobile carrier network 12 side is released, such that the necessary setting is concentrated into that on the home local network 3 side. This measure is taken from a viewpoint of not wasting the access channel resources unnecessarily.

Figure 8:
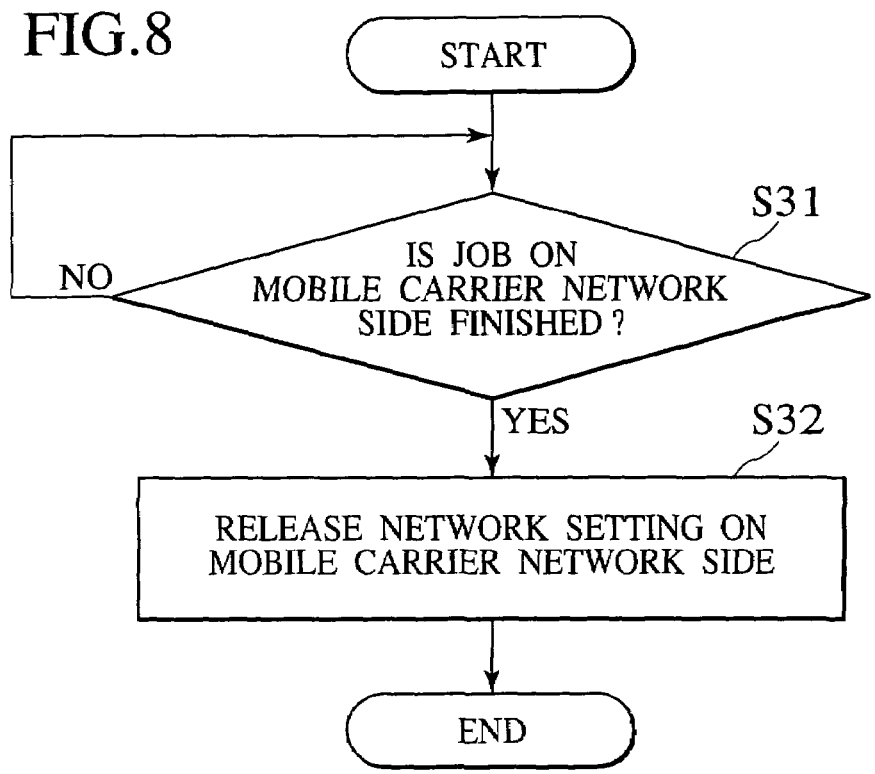
FIG. 8 is a flow chart showing an exemplary processing procedure for another operation by the mobile terminal device of FIG. 3.

FIG. 8 shows an exemplary processing procedure of the mobile terminal device 20 in this case. Namely, when all the jobs on the mobile carrier network 12 side are finished (step S31 YES), the entire network setting on the mobile carrier network 12 side is released (step S32).

Note that it is also possible to use a provision in which the mobile terminal device 20 transmits a message for notifying the finishing of all the services received via the mobile carrier network 12 to the gateway device 1 through the home local network 3, and the gateway device 1 notifies a message for setting up a global address (via the ISP network 9) to be set up on the home local network 3 side to the mobile terminal device 20 upon receiving the above message from the mobile terminal device 20 if such a global address is not set up yet.

Now, it is also possible to use a provision in which the network setting on the mobile carrier network 12 side is not released but reserved as an emergency communication path for the device 2 on the home local network 3 side to access the Internet 7 at a time of fault in the gateway device 1 or the ISP network 9, for example. Even in this case, all the existing devices 2 are initialized by the network setting on the home local network 3 side, so that they cannot use the channel of the mobile terminal device 20 without a further change, and for this reason, there is a need for the mobile terminal device 20 to function as a gateway with respect to the devices 2 on the home local network 3 side by carrying out the NAT/Proxy processing, etc.

Figure 9:
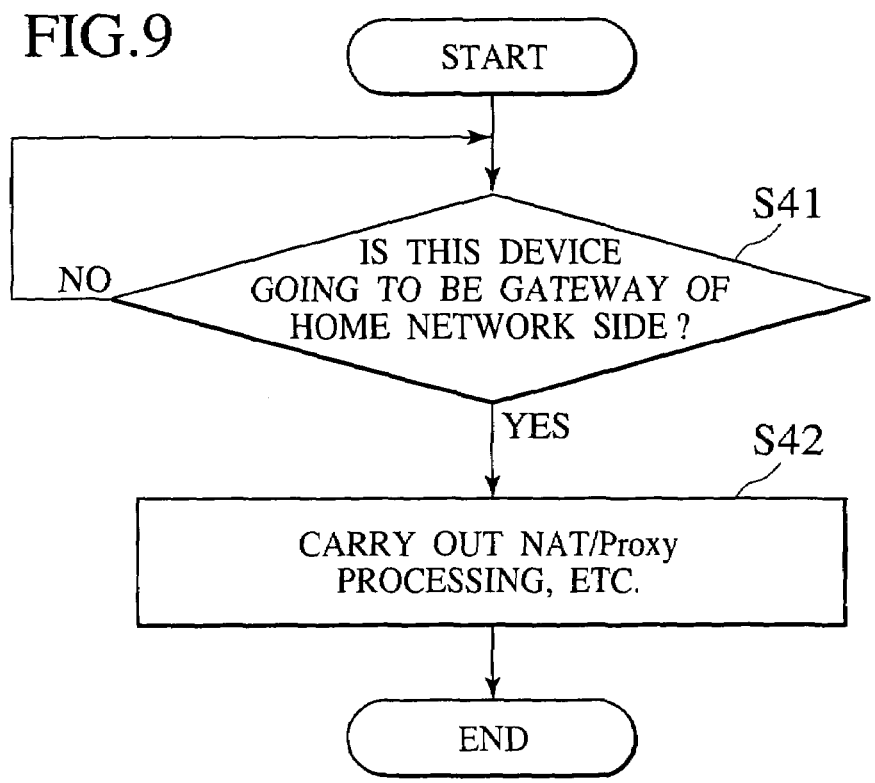
FIG. 9 is a flow chart showing an exemplary processing procedure for another operation by the mobile terminal device of FIG. 3.

FIG. 9 shows an exemplary processing procedure of the mobile terminal device 20 in this case. Namely, when the mobile terminal device 20 is going to be a gateway of the home network side (step S41 YES), the NAT/Proxy processing, etc., are carried out (step S42).

Also, in practice, the mobile terminal device 20 establishes the network setting on the home local network 3 side gradually, so that it is possible to make a transition to the state of using a link on the home local network 3 side regardless of the communication interface on the mobile carrier network 12 side.

Also, in the above, it is assumed that the communication interface to be used for the application is not to be changed during the communications for that application, but it is also possible to change the communication interface at appropriate timing during the communications for that application (from the mobile carrier network 12 side to the home local network 3 side, for example).

Note that, for the job that requires the link local or site local resource access on the mobile carrier network 12 side, the communication interface on the mobile carrier network 12 side is to be used until this job is finished (or until this job is cancelled).

Now, using the specification of the Mobile IPv6 which is currently under the standardization process by the IETF, it is possible to guarantee the mobility by regarding the mobile terminal device 20 that is actually connected to the mobile carrier network 12 side as having moved to the home local network 3 side. Here, a method for switching the belonging network according to the Mobile IPv6 will be described with references to FIGS. 10A and 10B.

Figure 10A:
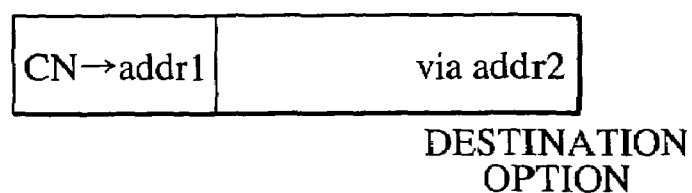
FIG. 10A is a diagram showing an exemplary packet header to be used in a method for switching a belonging network according to Mobile IPv6.

FIG. 10A shows an exemplary packet header in this case, which contains a source address (CN), a destination address (addr1) and a destination option (via addr2). Here, CN is a global address of the correspondent, addr1 is a global address of the mobile terminal device 20 on the mobile carrier network 12 side, and addr2 is a global address of the mobile terminal device 20 on the home local network 3 side.

Also, the destination option specifies a location through which the packet should be transferred.

Figure 10B:
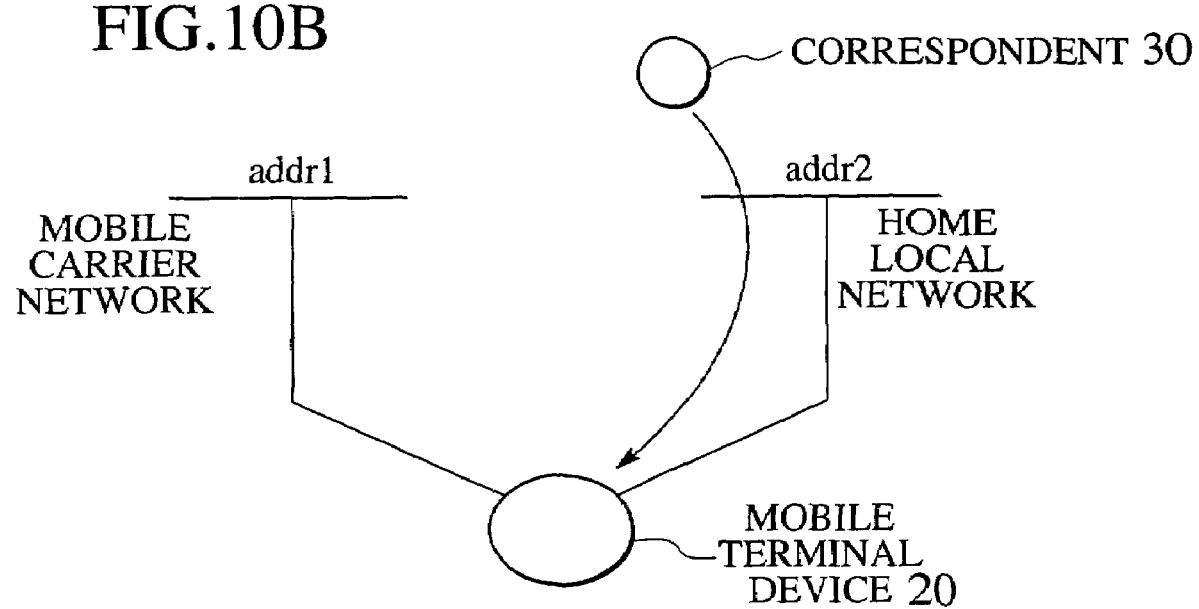
FIG. 10B is a schematic diagram for explaining a method for switching a belonging network according to Mobile IPv6.

Using the destination option of the IPv6, as shown in FIG. 10B, a packet transmitted from a correspondent 30 will be controlled to be transferred to the original address on the mobile carrier network 12 side via the address on the home local network 3 side. Then, in practice, the fact that this packet is destined to the mobile terminal device 20 is ascertained when the packet is captured at the address on the mobile carrier network 12 side, and the packet communication using a direct route becomes possible as the mobile terminal device 20 acquires this packet.

In the above, the case where the mobile terminal device 20 moves from the mobile carrier network 12 side into the home local network 3 side has been described, but the reverse case where the mobile terminal device 20 moves from the home local network 3 side out to the mobile carrier network 12 side can also be controlled similarly. Namely, the mobile terminal device 20 can establish a wireless link with the mobile carrier network 12 side, assign the necessary IPv6 addresses according to the address scopes of the necessary resources, and concentrates the setting to that of the mobile carrier network 12 side by releasing the address setting on the home local network 3 side when the jobs on the home local network 3 side are eventually finished. Also, the route selection policy in the case of becoming the multi-home state in a course of this operation can be determined similarly.

Also, in the above, it is assumed that the mobile terminal device 20 has the ordinary voice communication function, but the mobile terminal device 20 may have communication functions for information in other forms such as text communications in addition to or instead of the ordinary voice communication function. The mobile terminal device 20 may be a device which is capable of utilizing only the Internet service. The similar modifications are also possible with respect to the services provided by the communication service provider.

As described, according to the present invention, in the case where the mobile terminal device moves into the home local network while carrying out communications in the mobile carrier network, it is possible to construct the home local network side setting in the mobile terminal device phase by phase, according to the resources that become necessary in the home local network.

Also, in the case where the mobile terminal device temporarily becomes the so called multi-home state in which the IPv6 global addresses are assigned to both the home local network and the mobile carrier network, which one of the two communication interfaces should be used mainly can be determined appropriately by accounting for the user's preference regarding the network state, the charging condition, etc.

In addition, in the case where the communication jobs on the mobile carrier network side are finished, the mobile terminal device can release the network setting immediately such that all communications can be concentrated to those via the home local network.

Furthermore, these setting conditions can be finely adjusted according to the user's preference, such that it is possible to freely devise a policy (within a range of violating the scope rule for each application, for example) such as that all the jobs are re-constructed as the home local network based ones immediately once the wireless link with the home local network is established, as long as no service dependent on the mobile carrier network side is received, for example.

Thus according to the present invention, the mobile terminal device can judge whether the resource necessary on the local network side is a resource that is on-link (a device with which communications can be carried out directly), or a resource that is closed within the same site, or a resource other than these, by using the service lookup or the like, and assign the IPv6 address of the scope corresponding to that location to the local network side.

When the required resource is on the global Internet, it is accessible from both the mobile communication network and the fixed network, and it is possible to judge whether the mobile terminal device is to become a router in the multi-home state or the access is to be continued on the mobile communication network side alone, for example, by accounting for the network state, the charging condition, etc.

It is also possible to update the network setting such that the Internet service can be continued by the fixed communication network side alone by releasing the address on the mobile communication network side, when all the services of the mobile communication network are finished as the time elapses, for example. It is also possible to carry out the similar control even in the case of making a transition from the fixed communication network to the mobile communication network in the reverse direction.

Consequently, according to the present invention, in the case where the mobile terminal device moves into the local network while receiving the communication services on the mobile communication network side, it is possible to determine the address setting, the communication route selection, etc., on the local network side appropriately by accounting for the user's policy, the necessary resources, etc.

Note that the home network used in the above described can be replaced by any other local network without affecting the applicability of the present invention.

Note also that, in the present invention, the existing IPv6 devices can be used without requiring any modification, and the conventional IPv6 addressing architecture can be used without any change. Consequently, it is advantageous in terms of the compatibility with the existing devices.

Note also that the present invention can be easily expanded according to the network management policies of the various mobile carriers. The present invention is also applicable not only to the IPv6 but also to the packet communications using the cellular phones that are proposed recently.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the gateway device and the mobile terminal device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile terminal device capable of accessing both a mobile communication network and a local network simultaneously, the mobile terminal device comprising:
   a first communication interface provided with respect to the mobile communication network;
   a second communication interface provided with respect to the local network;
   a packet communication unit configured to carry out first packet communications through the first communication interface and second packet communications through the second communication interface;
   an inquiry message transmission unit configured to transmit to a gateway device an inquiry message for inquiring information regarding a location on networks of a correspondent of packet communications to be carried out, through the second communication interface; and
   an address assignment unit configured to receive a response message in response to the inquiry message through the second communication interface, acquire an address to be used by the mobile terminal device in the packet communications with the correspondent according to the response message, and assign the address to the second communication interface.

2. The mobile terminal device of claim 1, further comprising:
   a judgment unit configured to judge a manner of utilizing the first packet communications and the second packet communications according to a prescribed policy, when both the first packet communications and the second packet communications are possible.

3. The mobile terminal device of claim 2, wherein when the address assignment unit assigns one global address to the second communication interface while the mobile terminal device is already connected to the mobile communication network by using another global address through the first communication interface, the judgment unit judges which one of the first packet communications using the another global address via the mobile communication network through the first communication interface and the second packet communications using the one global address via the local network through the second communication interface should be used, by accounting for at least one of a state, a performance or a charging condition of the mobile communication network and a state, a performance or a charging information of an external communication network to which the local network is connected.

4. The mobile terminal device of claim 1, wherein the address assignment unit assigns a link local address as defined in IPv6 to the second communication interface when the location of the correspondent is on-link, assigns a site local address as defined in IPv6 to the second communication interface when the location of the correspondent is within a site accessible from the second communication interface, or assigns a global address to the second communication interface otherwise.

5. The mobile terminal device of claim 1, wherein the packet communication unit releases an entire network setting on the mobile communication network side or change a network setting of all applications on the mobile terminal device to a network setting on the local network side, when all services received through the first communication interface via the mobile communication network are finished after accessing the local network trough the second communication interface.

6. The mobile terminal device of claim 1, wherein the packet communication unit has a gateway function for relaying packet communications of another device connected to the local network by using the first communication interface and the second communication interface, when both the first packet communications through the first communication interface and the second packet communications through the second communication interface are possible.

7. The mobile terminal device of claim 1, wherein the second communication interface supports Bluetooth as the local network.

8. The mobile terminal device of claim 1, further comprising a voice communication unit configured to carry out voice communications.

9. An address assignment method for a mobile terminal device capable of accessing both a mobile communication network and a local network simultaneously, the method comprising:
   transmitting to a gateway device an inquiry message for inquiring information regarding a location on networks of a correspondent of packet communications to be carried out, from the mobile terminal device through the local network; and
   receiving a response message in response to the inquiry message through the local network at the mobile terminal device;
   acquiring an address to be used by the mobile terminal device in the packet communications with the correspondent according to the response message; and
   assigning the address to a communication interface for the local network at the mobile terminal device; and
   communicating with the correspondent using the address assigned to said communication interface.

10. A computer readable medium storing a computer program for causing a computer of a mobile terminal device capable of accessing both a mobile communication network and a local network simultaneously, to execute an address assignment, the computer readable medium comprising:
   first computer program codes for causing the computer to transmit an inquiry message for inquiring information regarding a location on networks of correspondent of packet communications to be carried out, from the mobile terminal device through the local network;
   second computer program codes for causing the computer to receive a response message in response to the inquiry message through the local network;
   third computer program codes for causing the computer to acquire an address to be used by the mobile terminal device in the packet communications with the correspondent according to the response message; and
   fourth computer program codes for causing the computer to assign the address to a communication interface for the local network at the mobile terminal device.

* * * * *